3,363,026
EPOXY RESIN CONTAINING A CURING CATALYST MIXTURE OF A POLYMERCAPTAN AND A FUSED RING AMINE
Gene E. Schroll, Louisville, Ky., assignor to Celanese Coatings Company, a corporation of Delaware
No Drawing. Filed Feb. 7, 1966, Ser. No. 525,310
15 Claims. (Cl. 260—831)

This invention relates to a novel method of curing linear polymeric glycidyl polyethers.

More particularly, this invention relates to novel catalyst systems for curing linear polymeric glycidyl polyethers which permit the rapid curing of said polyethers, in the form of films, coatings, and the like, at relatively low temperatures.

Linear polymeric glycidyl polyethers, and particularly those prepared from a dihydric phenol such as bisphenol A [2,2-bis (4-hydroxyphenyl) propane] and an epihalohydrin such as epichlorohydrin, which can also be referred to as epoxy resins, polyepoxide resins or polyepoxides, have become increasingly important commercially in recent years. When cured, these thermosetting resins form insoluble, infusible films, pottings, castings, and the like, and are markedly superior in their physical, chemical and electrical properties to other cured thermosetting resins. First of all, they exhibit low shrinkage during curing, and the combination of hardness and toughness exhibited by the cured resins, as well as their resistance to degradation by solvents and other chemicals and their electrical properties, such as dielectric constant and resistivity, can be classed as outstanding. At the same time, these properties can be varied within wide limits depending on the end use intended for the resin.

Of the wide variety of curing or cross-linking agents which have been used to cure these polyepoxide resins, no one is suitable for all applications, and many have serious drawbacks no matter what the application.

Organic polybasic acid anhydrides are used quite extensively as curing agents, but curable polyepoxide compositions containing them are generally found to have low exortherm values. This means that such compositions must be cured for long periods of time, during which vaporization and loss of the curing agent can take place. It is primarily for this reason that anhydrides are generally not suitable in film-forming applications. In addition, since most anhydrides and polyepoxides are incompatible at room temperature (about 25° C.), anhydride-containing polyepoxide compositions must usually be heated to bring about curing. This can be undesirable or even impossible in many applications.

Amines of various types are frequently employed as curing agents for polyepoxide resins, but the results obtained vary depending on a number of factors, such as the particular amine and polyepoxide resin employed, the curing temperature, the use for which the catalyzed composition is intended, and so on. Many amines do not give satisfactory results over a wide range of curing conditions; for example, the curing times necessary when using certain amines are longer than desirable or practical, while with other amines, the catalyzed composition has little or no stability even at room temperature.

Phenols have been employed somewhat less extensively as curing agents for polyepoxide resins, inasmuch as they generally require relatively high temperatures to give effective cures.

It has now been discovered that the combination of
(A) At least one polymercaptan, and preferably a dimercaptan, e.g., 2,2′-dimercaptodiethyl ether, which has the structural formula

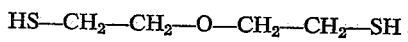

and (A)

(B) At least one bicyclic fused ring amine containing only carbon, hydrogen and nitrogen and having a nitrogen atom in at least one of the bridgehead positions, said nitrogen atom being connected to three different saturated carbon atoms and bearing an unshared pair of electrons, e.g., triethylene diamine, which has the structural formula

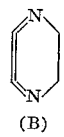

(B)

in amounts which will be described in detail hereinbelow, provides a rapid, effective catalyst system for curing polyepoxide resinous films and coatings, which system overcomes many of the difficulties associated with known curing catalysts and curing system for polyepoxide resins.

It has also been discovered that where increased toughness is desired in the polyepoxide resins cured with the novel catalyst systems of the present invention, a third catalyst component, namely, (C) At least one tertiary amine having no bridged atoms in its structure and having at least one tertiary amino group which is not part of a polycyclic ring system, e.g., 2,4,6-tri (dimethylaminomethyl) phenol, which has the structural formula

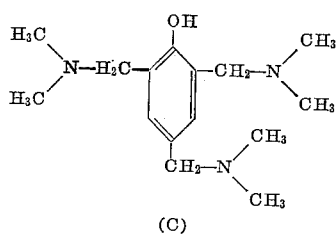

(C)

can be added to the catalyst system, in amounts which will also be described in greater detail hereinbelow, to provide this feature without detracting from the other advantages of the system.

There are many applications where it is or would be desirable to use a curable polyepoxide composition in the form of a film. For instance, it would be highly desirable to employ curable polyepoxide compositions containing convential reflective materials (to which the cured polyepoxide resin adheres) as relatively thin strips, e.g., in the order of from about 0.5 mil to about 60 mils in thickness, on concrete or asphalt roadways to provide novel and durable traffic control markings, such as lane markers, stop lines and other warning or directional markings. Such an application would be one in which the generally good adhesiveness, toughness and durability of polyepoxide resins could be of great benefit. The difficulty here, however, is to find a catalyst or curing system which will work rapidly and still give cured films which exhibit the desired properties.

Similarly, polyepoxides are or would be valuable in numerous adhesive applications, such as in bonding metals to metals, bonding electrical fixtures to walls and ceilings, bonding traffic buttons to roadways to provide traffic control markings, or in do-it-yourself epoxy resin adhesive kits, or as protective coatings on many metals, or as sealants for joints in concrete curtain walls or slab ceilings. Again, whether or not a polyepoxide composition can be used for any particular application in these areas depends in large measure on the available catalyst systems.

When using the novel catalyst systems of the present invention, polyepoxide films and coatings can be satisfactorily cured more rapidly and at lower temperatures, particularly on basic surfaces or substrates such as concrete and the like, than had hitherto been possible using known catalyst systems. More particularly, tough, adherent, substantially cured polyepoxide resin films and coatings can be obtained in accordance with the practice of the present invention at temperatures ranging from about 0° F. to about 300° F., and more commonly at from about 15° F. to about 80° F., in from about 15 seconds at the upper end of the above-stated broad temperature range to about 72 hours at the lower end of said range, or in from about 60 seconds at the upper end of the above-stated narrow temperature range to about 3 hours at the lower end of said range, which renders the thus-catalyzed compositions ideal for the aforementioned applications.

Parenthetically, it should be noted here that while Lewis acids are known to give fast cures with polyepoxide resins, the thus-cured resins have poor adhesion to basic surfaces.

In this context, the expression "substantial cure" corresponds to the stage at which the films or coatings have developed useful properties. For example, in the case of traffic control marking strips or buttons, at this stage automobiles could run over them without damaging or loosening them.

The polymercaptans employed in the novel catalyst systems of the present invention are, as previously indicated, preferably dimercaptans, and a preferred class of dimercaptans which can be used encompasses those compounds represented by the general formula

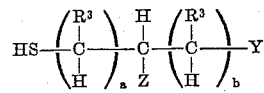

(D)

In this formula R and $R^2$ each represent hydrogen or a lower alkyl (including straight and branched-chain lower alkyl) group, such as methyl, ethyl, propyl, isopropyl, or the like, with any lower alkyl group or groups represented by R being the same as any represented by $R^2$; R' represents hydrogen or a straight-chain lower alkyl group, with all the straight-chain lower alkyl groups represented by R' being the same; X represents oxygen or sulfur; $n$ and $n'$ are the same integer of from 1 to 9, inclusive, $p$ is an integer from 1 to 10 inclusive, and $q$ is an integer of from 0 to 2, inclusive.

An illustrative but by no means exhaustive listing of such dimercaptans includes dimercaptodialkyl ethers such as 2,2'-dimercaptodiethyl ether, 2,2'-dimercaptodipropyl ether, 2,2'-dimercaptodiisopropyl ether, 3,3'-dimercaptodipropyl ether, and the like, dimercaptodialkyl sulfides such as 2,2'-dimercaptodiethyl sulfide, 3,3'-dimercaptodipropyl sulfide, 1,11-dimercapto-3,9-dioxa-6-thiaundecane, and the like, bis(mercaptoalkoxy) alkanes such as bis β-mercaptoethoxy) methane, 1,11-dimercapto-3,6,9-trioxaundecane, and the like, and bis (mercaptoalkylthio) alkanes such as bis (β-mercaptoethylthio) methane, and the like.

Another class of dimercaptans which can be used in the novel catalyst systems of the present invention includes those compounds represented by the general formula

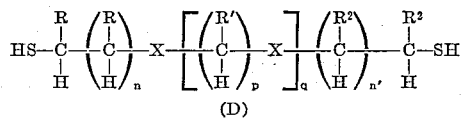

In this formula $R^3$ represents hydrogen or a lower alkyl group, Y and Z represent hydrogen, a hydroxyl group or a mercapto group, with Y and Z being different and one being a mercapto group, $a$ is an integer of from 1 to 19, inclusive, and $b$ is an integer of from 0 to 28, inclusive, with the sum of $a$ and $b$ being no more than 29.

Among such alkylenedimercaptans and hydroxyalkylenedimercaptans there can be mentioned ethanedithiol-1,2, propanedithiol-1,2, propanedithiol-1,3, butanedithiol-1,2, butanedithiol-1,3, butanedithiol-1,4, pentanedithiol-1,3, pentanedithiol-1,5, hexanedithiol-1,2, hexanedithiol-1,6, heptanedithiol-1,7, octanedithiol-1,8- decanedithiol-1,10; 2,6-dimethyloctanedithiol-3,7, dodecanedithiol-1,12, octadecanedithiol-1,18; 2,3-dimercaptopropanol-1; 3,4-dimercaptobutanol-1; 2-hydroxypropanedithiol-1,3; 2-hydroxybutanedithiol-1,4, and the like.

The above-described hydroxyalkylenedimercaptans, and especially compounds such as 2-hydroxypropanedithiol-1,3 (glycerol-1,3-dimercaptan), impart the additional advantage of excellent adhesion to glass to polyepoxide resins cured with the catalyst systems containing them.

Still another class of dimercaptans useful in applicant's novel catalyst systems includes those compounds represented by the general formula

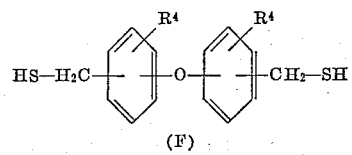

(F)

In this formula $R^4$ represents hydrogen, a lower alkyl group, a lower alkoxy group, an aryloxy group, fluorine, chlorine or bromine.

Included among these dimercaptans are (4,4'-mercaptomethyl) diphenyl ether, (2,2'-mercaptomethyl-4,4'-methyl) diphenyl ether, (4,4-ethyl-2,2'-mercaptomethyl) diphenyl ether, (4,4'-fluoro-2,2'-mercaptomethyl) diphenyl ether, and the like.

These dimercaptans can be prepared by chloromethylating the corresponding diphenyl ether (either unsubstituted or substituted as described above), using the techniques described by Fuson et al. in "Organic Reactions," vol. 1, Chapter 3 (New York: John Wiley & Sons, 1942) or in Belgian Patent No. 640,057, and then replacing the chlorine atoms of the two introduced chloromethyl groups with mercapto groups in known manner, e.g., with thiourea in the manner described by Lewis et al. in J. Am. Chem. Soc., vol. 73, page 2109 (1951).

The bicyclic fused ring amine [component (B) as listed hereinabove] which is employed in applicant's novel catalyst systems is preferably triethylene diamine, but other amines of this type, e.g., 1,3-diazabicyclo [2.2.0] hexane, 1,3,5-triazabicyclo [2.2.0] hexane, 1-azabicyclo [2.2.1] heptane, 1-azabicyclo [3.3.1] nonane, pyrrolizidine (1-azabicyclo [0.3.3] octane), quinuclidine (1-azabicyclo [2.2.2] octane), 1,3-ethylenepiperidine (1-azabicyclo [3.2.1] octane), conidine (1-azabicyclo [4.2.0] octane), 1,3-diazabicyclo [2.2.2] octane, 1-azabicyclo [3.2.2] nonane, 1-isogranatanine (1-azabicyclo [3.3.1]

nonane), pentamethylenetetramine (1,3,5,7-tetraazabicyclo [3.3.1] nonane), 1-azabicyclo [0.3.5] decane, norlupinane (1-azabicyclo [0.4.4]decane), sparteine, and the like, can also be used.

The tertiary amine [optional component (C) as listed hereinabove] which can be employed in the novel catalyst systems of the present invention when additional toughness is desired can be any tertiary amine which will, by itself, serve to cure polyepoxides. A preferred class of tertiary amines which can be used encompasses those compounds represented by the general formula

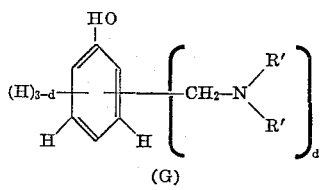

(G)

In this formula R' has the same meaning as set forth hereinabove for Formula D, and $d$ is an integer of from 1 to 3, inclusive.

Included among such amines are dimethylaminomethylphenol, diethylaminomethylphenol, 2,4-di-(dimethylaminomethyl) phenol, 2,4,6-tri (dimethylaminomethyl) phenol, and the like.

Among other tertiary amines which are especially suitable are triethylamine, tri-n-propylamine, triisopropylamine, tributylamine, dimethylaniline, higher homologous and isomeric trialkyl, dialkylaryl and alkyldiarylamines; various N-substituted tertiary amines having different organic radicals, e.g., alkyl, aryl, alkaryl or aralkyl, on the amine nitrogen atom, such as benzyldimethylamine and α-methylbenzyldimethylamine, alkyol and alkyl alkylol tertiary amines such as triethanolamine, tripropanolamine, triisopropanolamine, dimethylethanolamine, diethylethanolamine, dimethylpropanolamine, methyldiethanolamine, ethyldiethanolamine, propyldiethanolamine, and the like.

The amounts in which any specific embodiments of the novel catalyst systems of the present invention are employed, as well as the presence or absence of optional component (C), will of course vary from use to use depending on such factors as the particular polyepoxide resin being cured (or more precisely the epoxide equivalents of said resin), the intended use of the catalyzed composition, and so on.

With respect to the components of these systems themselves, the polymercaptan will generally be used in amounts which will provide from about 0.4 to about 2 equivalents of polymercaptan, and preferably from about 0.6 to about 1 equivalent (each mercapto group having one active hydrogen) per epoxide equivalent present. Thus, for example, in the case of 2,2'-dimercaptodiethyl ether and a polyepoxide resin prepared from bisphenol A and epichlorohydrin and having an epoxide equivalent of approximately 190, from about 14 to about 74 grams of the dimercaptan will be employed for each 100 grams of the resin.

Together with these amounts of polymercaptan, from about 0.05 to about 5 parts by weight, and preferably from about 0.1 to about 2 parts by weight, per 100 parts by weight of the epoxy resin, of the bicyclic fused ring amine will generally be employed.

When one or more of the tertiary amines described as optional component (C) hereinabove are used, they will usually be present in amounts ranging up to about 30 parts by weight, and preferably from about 5 to about 20 parts by weight, per 100 parts by weight of the epoxy resin.

Although catalytic combinations made up of one compound from each of the above-listed classes, i.e., a mixture of one polymercaptan, one bicyclic fused ring amine, and when used, one tertiary amine, are preferred in many cases, when desired, mixtures containing two or more compounds from one, two or all three of the above-listed classes, e.g., a mixture of two polymercaptans, such as 2,2'-dimercaptodiethyl ether and 2,2'-dimercaptodiethyl sulfide, together with the bicyclic fused ring amine, can also be used.

Among the linear polymeric glycidyl polyethers which can be cured to the thermoset, i.e., substantially insoluble and infusible, state using the novel catalyst systems of the present invention are, first of all, products made by reacting a dihydric phenol with from about 1.2 to about 10 mols, per mol of said phenol, of a halohydrin in the presence of a sufficient amount of caustic alkali, e.g., sodium hydroxide or potassium hydroxide, to combine with the halogen from the halohydrin. Such products are substantially straight chain polymeric materials which, in some cases, can be admixed with the corresponding monomeric materials, i.e., the corresponding diglycidyl ethers of the dihydric phenol, and are characterized by the presence, on the average, of more than one 1,2-epoxy group, and generally at least two 1,2-epoxy groups per molecule, and they will preferably have a weight per epoxy group ranging from about 180 to about 2000. Numerous methods for their preparation are known to those skilled in the art, and have been described in U.S. Patents Nos. 2,467,171; 2,538,072; 2,582,985; 2,615,007 and 2,698,315, among others.

Included among the dihydric phenols which can be employed in preparing such polyethers are mononuclear dihydric phenols such as catechol, resorcinol, orcinol, xylorcinol or hydroquinone, and polynuclear dihydric phenols such as bisphenol A, 2,2-bis(4-hydroxyphenyl) ethane; 1,1-bis(4-hydroxyphenyl)isobutane; 2,2-bis(4-hydroxyphenyl)butane; 4,4'-dihydroxybenzophenone; bis(2-hydroxynaphthyl)-methane; 1,3 - dihydroxynaphthalene or 1,5-dihydroxynaphthalene, and the like, while the halohydrins which can be used include epihalohydrins such as epichlorohydrin, epibromohydrin; 3 - chloro-1,2-epoxy butane; 3-bromo-1,2-epoxyhexane or 3-chloro-1,2-epoxy octane, and dihalohydrins such as glycerol dichlorohydrin, and the like.

Linear polymeric glycidyl polyethers having higher melting points than the resinous products obtained by the processes described in the above-mentioned patents can be prepared by further reacting said resinous products with additional dihydric phenol in the manner described in U.S. Patent No. 2,615,008.

Another class of linear polymeric glycidyl polyethers which can be cured using applicant's novel catalyst systems includes products prepared by reacting a polyhydric alcohol, such as ethylene glycol, glycerol, trimethylolethane, trimethylolpropane or the like, with a halohydrin in the manner described in U.S. Patent No. 2,581,464.

Varying amounts of other types of epoxy resins can be admixed with the aforementioned linear polymeric glycidyl polyethers and cured using applicant's novel catalyst systems. Thus, for example, from about 20% to about 80% by weight, and preferably from about 50% to about 70% by weight, based on the total weight of the epoxy resin portion of the composition, of an epoxy novolac resin [see Lee & Neville, "Epoxy Resins" (New York: McGraw-Hill Co., Inc., 1957) at page 18] can be incorporated where increased reactivity and heat-distortion temperature and better high temperature performance are desired.

In a preferred embodiment of the present invention, which facilitates the mixing of the catalyst composition with the curable polyepoxide resin, all of the polymercaptan, together with either from about 1% by weight to all of the bicyclic fused ring amine, or, if used, from about 1% to about 10% by weight of the tertiary amine [component (C)], is admixed with a diglycidyl ether of a dihydric phenol or polyhydric alcohol of the type mentioned hereinabove, e.g., the diglycidyl ether of bisphenol A, with the mol ratio of the polymercaptan to said diglycidyl ether being from about 2.5:1 to about 10:1, respectively, to give an adduct having about 2 mols of polymercaptan per mol of said diglycidyl ether. When mixing these materials, said diglycidyl ether is added to the polymercaptan at a temperature (generally from about 150° F. to about 250° F.) and a rate such that the adduct is formed almost instantaneously and any exothermic temperature rise which would normally accompany the formation of the adduct is minimized. Once the adduct is formed, the remainder of the catalyst component (if not already present) can be added either immediately or upon the addition of the adduct to the epoxy resin to be cured.

Curable polyepoxide resin compositions containing the novel catalyst systems of the present invention can also contain conventional fillers, extenders, solvents, and the like. Thus, for example, when using such compositions as protective coatings, commonly used organic solvents, e.g., aromatic hydrocarbons such as benzene, toluene and xylene, ketones such as methyl ethyl ketone and methyl isobutyl ketone, ethers such as dioxane, tetrahydrofuran, tetrahydropyran, Cellosolves, such as Cellosolve acetate (ethylene glycol monoethyl ether acetate), Carbitols, such as Carbitol acetate (diethylene glycol monoethyl ether acetate), higher polyethylene and polypropylene glycol ethers and ether-esters, and the like, as well as mixtures thereof, can be present. Similarly, fillers such as sand, silica flour, aluminum silicate clays, asbestos, Wollastonite, marble chips, marble dust, glass fibers, and the like, can be employed when these catalyzed compositions are used for such purposes as sealants or adhesives, or in terrazzo tile, or the like.

In order that those skilled in the art can more fully understand the present invention, the following examples are set forth. These examples are given solely for the purpose of illustrating the invention, and should not be considered as expressing limitations unless so set forth in the appended claims. All parts and percentages are by weight, unless otherwise stated.

PREPARATION A 0.09 part of 2,4,6-tri(dimethylaminomethyl) phenol was dissolved in 54.13 parts of 2,2'-dimercaptodiethyl ether, which had previously been heated to 200° F., and the temperature of the resulting mixture was then raised to 250° F. To this mixture there was then added over a 2½ hour period, with stirring 45.78 parts of the diglycidyl ether of bisphenol A, which had previously been heated to 130° F., with the temperature of the reaction mixture being maintained at 250–270° F. during this addition to prevent an exothermic temperature rise during the formation of the dimercaptan-diglycidyl ether adduct. Following the addition of the last of the diglycidyl ether, the adduct was held at 250° F. for 30 minutes, then allowed to cool to room temperature (about 77° F.), at which point it was ready for use.

PREPARATION B

The procedure of Preparation A hereinabove was repeated in every detail except for the following. 0.26 part of 2,4,6-tri(dimethylaminomethyl) phenol, 54.04 parts of 2,2'-dimercaptodiethyl ether and 45.70 parts of the diglycidyl ether of bisphenol A were used, and the temperature of the reaction mixture was held at 200–220° F. during the formation of the dimercaptan-diglycidyl ether adduct.

PREPARATION C

The procedure of Preparation A hereinabove was again repeated in every detail except for the following. 0.09 part of triethylene diamine was used in place of the 2,4,6-tri(dimethylaminomethyl) phenol, and the temperature of the reaction mixture was held at 200–220° F. during the formation of the dimercaptan-diglycidyl ether adduct.

PREPARATION D

The procedure of Preparation A hereinabove was again repeated in every detail except for the following. 0.09 part of triethylene diamine was used in place of 2,4,6-tri(dimethylaminomethyl) phenol, 54.04 parts of 2,2'-dimercaptodiethyl ether and 45.70 parts of the diglycidyl ether of bisphenol A were used, and the reaction mixture was held at 200–220° F. for the first 45 minutes of the reaction, then raised to 250–270° F. and held at that temperature for 22 minutes. During this time the dimercaptan-diglycidyl ether adduct was formed.

PREPARATION E

The procedure of Preparation A hereinabove was again repeated in every detail except for the following. 0.09 part of 2,4,6-tri(dimethylaminomethyl) phenol, 48.42 parts of 2,2'-dimercaptodiethyl ether and 40.95 parts of the diglycidyl ether of bisphenol A were used. After the addition of the last of the diglycidyl ether, the adduct was held at 250° F. for 30 minutes, then lowered to 200° F. At this point, 10.04 parts of 2,4,6-tri(dimethylaminomethyl) phenol and 0.5 part of triethylene diamine were added, and the resulting mixture was held at 200° F. for 30 minutes, then allowed to cool to room temperature, at which point it was ready for use.

PREPARATIONS F–J

The procedure of Preparation E hereinabove was repeated in every detail in each of these preparations with the exception that equivalent amounts of the polymercaptans, bicyclic fused ring amines and tertiary amines listed in Table I hereinbelow were employed in place of 2,2'-dimercaptodiethyl ether, 2,4,6-tri(dimethylaminomethyl)phenol and (in one case) triethylene diamine, respectively.

TABLE I

| Preparation | Polymercaptan | Bicyclic Amine | Tertiary Amine |
|---|---|---|---|
| F | 95% 2,2'-dimercaptodiethyl ether—5% 2,2'-dimercaptodiethyl sulfide. | Triethlene diamine. | Diethylaminoethyl phenol. |
| G | 2,2'-dimercaptodiisopropyl ether. | ----do---- | Dimethylaniline. |
| H | Bis (β-mercaptoethoxy methane). | ----do---- | 2,4-di(dimethylaminomethyl) phenol. |
| I | Butanedithiol-1,2 | Quinuclidine. | Tripropanolamine. |
| J | 2-hydroxypropanedithiol-1,3. | Triethylene diamine. | Benzyldimethylamine. |

*Examples I–XI*

Various mixtures of Epoxy Resin Z, a polyglycidyl ether of trimethylolethane having a weight per epoxide of 138–153, a viscosity (measured at 25° C.) of 175–350 cps. and a specific gravity of 1.16–1.18 (see U.S. Patent No. 3,033,803 to Price et al.), and Epoxy Resin Y, an epoxy novolac based on an unsubstituted phenol-formaldehyde resin and having a weight per epoxide of 175–190, a viscosity at 125° F. of 30,000–90,000 cps. and at 160° F. of approximately 3,500 cps. and a specific gravity of 1.2, were catalyzed in the manner described in Table II hereinbelow and cured at room temperature in the form of films, the characteristics of which are also given in this table.

TABLE II

| Material | Example | | | | | | | | | | |
|---|---|---|---|---|---|---|---|---|---|---|---|
| | I | II | III | IV | V | VI | VII | VIII | IX | X | XI |
| Epoxy Resin Z [1] | 50 | 50 | 50 | 50 | 50 | 50 | 50 | 40 | 40 | 40 | 40 |
| Epoxy Resin Y [1] | 50 | 50 | 50 | 50 | 50 | 50 | 50 | 60 | 60 | 60 | 60 |
| Adduct of Preparation: | | | | | | | | | | | |
| A | 90 | 90 | 90 | 90 | 90 | 90 | 90 | 89 | | | |
| B | | | | | | | | | 89 | | |
| C | | | | | | | | | | 89 | |
| D | | | | | | | | | | | 89 |
| 2,4,6-tri(dimethylaminoethyl)phenol [1 3] | | | | | 10 | 20 | 10 | 10 | 10 | 10 | 10 |
| Triethylene diamine [1 3] | 2 | 1 | 1 | 1 | 1 | 0.5 | 0.5 | 0.5 | 0.5 | 0.5 | 0.5 |
| Films, gel time at 77° F.[2]: | | | | | | | | | | | |
| 30 mil | 2.3 | 4.1 | 2.9 | 1.8 | 1.7 | 3.5 | 3.5 | 3.5 | 4.0 | 3.04 | 2.50 |
| 2.5 mil | 6.1 | 8.3 | 5.6 | 4.2 | 5.0 | 4.4 | 5.0 | 5.0 | 6.0 | 5.0 | 4.0 |
| Remarks | | Very flexible | | Fairly flexible, slightly cheesy | Slightly flexible and tough | More flexible than Ex. V, tough | Slightly flexible and tough | | Tough and flexible | | |

[1] Parts by weight.  [2] In minutes.  [3] Over and above any amount present in adduct.

Example XII

Fifty parts of Epoxy Resin Z, 50 parts of Epoxy Resin Y, 90 parts of Cab-o-lite P4 (calcium silicate) and 10 parts of titanium dioxide were admixed to give a material designated as Epoxy Resin X.

Ninety parts of the adduct of Preparation A hereinabove, 10 parts of 2,4,6-tri(dimethylaminomethyl)phenol, 0.5 part of triethylene diamine, 0.5 part of carbon black, 80 parts of Cab-o-lite P4 and 10 parts of Cab-o-sil M5 (colloidal silica gel) were admixed to give a material designated as Catalyst X.

Epoxy Resin X and Catalyst X were then admixed in a ratio of 1:1 by volume. A 30-mil film of the resulting catalyzed resinous composition had a gel time at 77° F. of 4.5 minutes, while a 2.5-mil film had a gel time at 77° F. of 6 minutes.

The bonding strength of this catalyzed resinous composition on concrete at room temperature was then tested by The Tensile Bond Test, and its tensile shear strength at room temperature in bonding aluminum to aluminum was also tested. The results of these tests are given in Table III hereinbelow.

Example XIII

Forty parts of Epoxy Resin Z, 60 parts of Epoxy Resin Y, 90 parts of Cab-o-lite P4 and 10 parts of titanium dioxide were admixed to give a material designated as Epoxy Resin W.

Eight-nine parts of the adduct of Preparation A hereinabove, 10 parts of 2,4,6-tri(dimethylaminomethyl)phenol, 0.5 part of triethylene diamine, 0.5 part of carbon black, 81 parts of Cab-o-lite P4 and 10 parts of Cab-o-sil M5 were admixed to give a material designated as Catalyst W.

Epoxy Resin W and Catalyst W were then admixed in a ratio of 1:1 by volume. A 30-mil film of the resulting catalyzed resinous composition had a gel time at 77° F. of 4.5 minutes, while a 2.5-mil film had a gel time at 77° F. of 6 minutes.

The bonding strength of this catalyzed resinous composition on concrete at room temperature and its tensile shear strength at room temperature in bonding aluminum to aluminum were tested in the same manner as the composition of Example XII hereinabove. The results of these tests are also given in Table III hereinbelow.

TABLE III

| Test | Composition Ex. XII | Ex. XIII |
|---|---|---|
| I. Bond to Concrete (tensile bond test): | | |
| After 15 minutes: | | |
| Load [1] | [1] 1,350 | [1] 1,600 |
| P.s.i. | 355 | 421 |
| Type break, percent concrete | 100 | 100 |
| After one hour: | | |
| Load [1] | 1,000 | 1,150 |
| P.s.i. | 263 | 303 |
| Type break, percent concrete | 100 | 100 |
| After 24 hours: | | |
| Load [1] | 1,600 | 1,750 |
| P.s.i. | 421 | 461 |
| Type break, percent concrete | 100 | 100 |
| II. Tensile Shear Strength (aluminum to aluminum): | | |
| After 15 minutes: | | |
| Load [1] | [2] 648 | [2] 904 |
| P.s.i. | 1,282 | 1,778 |
| Type break, percent adhesive | 50 | 20 |
| After one hour: | | |
| Load [1] | 1,307 | 1,592 |
| P.s.i. | 2,501 | 3,101 |
| Type break, percent cohesive | 100 | 100 |

[1] In pounds.  [2] Average value.

Example XIV

Epoxy Resin V, a diglycidyl ether of bisphenol A having a weight per epoxide of 185–200, a viscosity (measured at 77° F.) of 10,000–16,000 cps. and a flash point of approximately 470° F., and the catalyst composition prepared as described in Preparation E hereinabove were admixed in a ratio of 1:1 by volume. Films (2.5 and 30 mils in thickness) drawn down using the thus-obtained catalyzed resinous composition cured rapidly at room temperature, and were flexible and tough when cured.

This procedure was then repeated using the catalyst compositions of Preparations F–J respectively, in place of that of Preparation E. In each case, the films (2.5 mils and 30 mils in thickness) made from the resulting catalyzed resinous composition cured rapidly at room temperature, and were flexible and tough when cured.

Example XV

One hundred fifty parts of Epoxy Resin V were admixed with 55 parts of 2,2′-dimercaptodiethyl ether, 10 parts of 2,4,6-tri(dimethylaminomethyl)-phenol and 0.5 part of triethylene diamine, with stirring at room temperature, and a 30-mil film was formed immediately from the resulting catalyzed resinous composition. This film cured rapidly at room temperature, and was flexible and tough when cured.

It will be obvious to those skilled in the art that other changes and variations can be made in carrying out the present invention without departing from the spirit and scope thereof as defined in the appended claims.

I claim:
1. A catalyzed epoxy resinous composition capable of rapidly curing in the form of a film at relatively low temperatures which comprises
   (A) a linear polymeric glycidyl polyether having, on the average, more than one 1,2-epoxy group per molecule, and
   (B) a curing catalyst for said polyether comprising
      (1) from about 0.4 to about 2 equivalents, per epoxide equivalent present, of a polymercaptan,
      (2) from about 0.5 to about 5 parts by weight, per 100 parts of said (A), of a bicyclic fused ring amine containing only carbon, hydrogen and nitrogen and having a nitrogen atom in at least one of the bridgehead positions, said nitrogen atom being connected to three different saturated carbon atoms and bearing an unshared pair of electrons, and
      (3) from 0 to about 30 parts by weight, per 100 parts of said (A), of a tertiary amine having no bridged atoms in its structure and having at least one tertiary amino group which is not part of a polycyclic ring system.

2. A catalyzed epoxy resinous composition as described in claim 1 wherein said (A) is a bisphenol A-epichlorohydrin reaction product.

3. A catalyzed epoxy resinous composition as described in claim 1 wherein said (A) is a polyhydric alcohol-epichlorohydrin reaction product together with from about 20% to about 80% by weight, based on the total weight of epoxy resin present, of an epoxy novalac resin.

4. A catalyzed epoxy resinous composition as described in claim 1 wherein said polymercaptan is a dimercaptan, and said bicyclic fused ring amine is triethylene diamine.

5. A catalyzed epoxy resinous composition as described in claim 1 wherein said polymercaptan is 2,2'-dimercaptodiethyl ether, and said bicyclic fused ring amine is triethylene diamine.

6. A catalyzed epoxy resinous composition as described in claim 1 wherein said polymercaptan is a mixture of 2,2'-dimercaptodiethyl ether and 2,2'-dimercaptodiethyl sulfide, and said bicyclic fused ring amine is triethylene diamine.

7. A catalyzed epoxy resinous composition as described in claim 1 wherein said polymercaptan is 2-hydroxypropanedithiol-1,3, and said bicyclic fused ring amine is triethylene diamine.

8. A catalyzed epoxy resinous composition as described in claim 1 wherein said polymercaptan is a dimercaptan, said bicyclic fused ring amine is triethylene diamine, and said tertiary amine is present in an amount ranging from about 5 to about 20 parts by weight, per 100 parts of said (A).

9. A catalyzed epoxy resinous composition as described in claim 1 wherein said polymercaptan is a dimercaptan, said bicyclic fused ring amine is triethylene diamine, and said tertiary amine is 2,4,6-tri(dimethylaminomethyl) phenol and is present in an amount ranging from about 5 to about 20 parts by weight, per 100 parts of said (A).

10. A catalyzed epoxy resinous composition as described in claim 1 wherein said polymercaptan is an adduct of a dimercaptan and the diglycidyl ether of bisphenol A, and said bicyclic fused ring amine is triethylene diamine.

11. A catalyzed epoxy resinous composition as described in claim 1 wherein said polymercaptan is an adduct of 2,2'-dimercaptodiethyl ether and the diglycidyl ether of bisphenol A, and said bicyclic fused ring amine is triethylene diamine.

12. A catalyzed epoxy resinous composition as described in claim 1 wherein said polymercaptan is an adduct of 2,2'-dimercaptodiethyl ether and the diglycidyl ether of bisphenol A, said bicyclic fused ring amine is triethylene diamine, and said tertiary amine is 2,4,6-tri(dimethylaminomethyl) phenol and is present in an amount ranging from about 5 to about 20 parts by weight, per 100 parts of said (A).

13. A susbtantially insoluble and infusible product obtained by curing a catalyzed epoxy resinous composition comprising
   (A) a linear polymeric glycidyl polyether having, on the average, more than one 1,2-epoxy group per molecule, and
   (B) a curing catalyst for said polyether comprising
      (1) from about 0.4 to about 2 equivalents, per epoxide equivalent present, of a polymercaptan,
      (2) from about 0.5 to about 5 parts by weight, per 100 parts of said (A), of a bicyclic fused ring amine containing only carbon, hydrogen and nitrogen and having a nitrogen atom in at least one of the bridgehead positions, said nitrogen atom being connected to three different saturated carbon atoms and bearing an unshared pair of electrons, and
      (3) from 0 to about 30 parts by weight, per 100 parts of said (A), of a tertiary amine having no bridged atoms in its structure and having at least one tertiary amino group which is not part of a polycyclic ring system.

14. A substantially insoluble and infusible product as described in claim 13 wherein said polymercaptan is 2,2'-dimercaptodiethyl ether, said bicyclic fused ring amine is triethylene diamine and said tertiary amine is 2,4,6-tri(dimethylaminomethyl) phenol and is present in an amount ranging from about 5 to about 20 parts by weight, per 100 parts of said (A).

15. A substantially insoluble and infusible product as described in claim 13 wherein said polymercaptan is an adduct of 2,2'-dimercaptodiethylether and the diglycidyl ether of bisphenol A, said bicyclic fused ring amine is triethylene diamine and said tertiary amine is 2,4,6-tri(dimethylaminomethyl) phenol and is present in an amount ranging from about 5 to about 20 parts by weight, per 100 parts of said (A).

No references cited.

WILLIAM H. SHORT, *Primary Examiner.*

T. D. KERWIN, *Assistant Examiner.*